United States Patent
Fukushima et al.

(10) Patent No.: US 10,144,856 B2
(45) Date of Patent: *Dec. 4, 2018

(54) WORKING FLUID FOR HEAT CYCLE, COMPOSITION FOR HEAT CYCLE SYSTEM, AND HEAT CYCLE SYSTEM

(71) Applicant: ASAHI GLASS COMPANY, LIMITED, Chiyoda-ku (JP)

(72) Inventors: Masato Fukushima, Chiyoda-ku (JP); Satoshi Kawaguchi, Chiyoda-ku (JP); Katsuya Ueno, Chiyoda-ku (JP); Toshiyuki Tanaka, Chiyoda-ku (JP); Hidekazu Okamoto, Chiyoda-ku (JP); Tetsuo Otsuka, Chiyoda-ku (JP); Yoshinobu Kadowaki, Chiyoda-ku (JP); Tatsuhiro Nogami, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,996

(22) Filed: Aug. 31, 2016

(65) Prior Publication Data

US 2016/0369145 A1 Dec. 22, 2016

Related U.S. Application Data

(63) Continuation of application No. PCT/JP2015/057899, filed on Mar. 17, 2015.

(30) Foreign Application Priority Data

Mar. 17, 2014 (JP) .................................. 2014-053765

(51) Int. Cl.
C09K 5/04 (2006.01)
C10M 171/00 (2006.01)
(Continued)

(52) U.S. Cl.
CPC ......... *C09K 5/045* (2013.01); *C10M 171/008* (2013.01); *F25B 1/00* (2013.01);
(Continued)

(58) Field of Classification Search
CPC .............. C09K 5/045; C09K 2205/126; C09K 2205/22
See application file for complete search history.

(56) References Cited

U.S. PATENT DOCUMENTS

2005/0233923 A1 10/2005 Singh et al.
2006/0022166 A1 2/2006 Wilson et al.
(Continued)

FOREIGN PATENT DOCUMENTS

EP 3 020 780 A1 5/2016
EP 3 109 301 A1 12/2016
(Continued)

OTHER PUBLICATIONS

International Search Report dated Jun. 16, 2015 in PCT/JP2015/057899, filed on Mar. 17, 2015.
(Continued)

*Primary Examiner* — John R Hardee
(74) *Attorney, Agent, or Firm* — Oblon, McClelland, Maier & Neustadt, L.L.P.

(57) ABSTRACT

A working fluid for heat cycle contains trifluoroethylene and 2,3,3,3-tetrafluoropropene. The proportion of the total amount of trifluoroethylene and 2,3,3,3-tetrafluoropropene based on the entire amount of the working fluid is higher than 90 mass % and at most 100 mass %. The proportion of trifluoroethylene based on the total amount of trifluoroethylene and 2,3,3,3-tetrafluoropropene is at least 21 mass % and at most 39 mass %. The working fluid has a low global warming potential and suppressed self-decomposition prop-
(Continued)

erty. A composition for a heat cycle system contains the working fluid and a heat cycle system employs the composition.

8 Claims, 2 Drawing Sheets

(51) Int. Cl.
    *F25B 1/00*     (2006.01)
    *F25B 31/00*     (2006.01)
    *F25B 43/00*     (2006.01)
    *F25B 43/02*     (2006.01)

(52) U.S. Cl.
    CPC .......... *F25B 31/002* (2013.01); *F25B 43/00* (2013.01); *F25B 43/02* (2013.01); *C09K 2205/126* (2013.01); *C09K 2205/22* (2013.01); *C10M 2205/0285* (2013.01); *C10M 2207/2835* (2013.01); *C10M 2209/043* (2013.01); *C10M 2209/1033* (2013.01); *C10N 2230/70* (2013.01); *C10N 2240/30* (2013.01); *F25B 2400/121* (2013.01); *F25B 2500/14* (2013.01); *F25B 2500/222* (2013.01)

(56) References Cited

U.S. PATENT DOCUMENTS

| | | | |
|---|---|---|---|
| 2010/0090156 A1 | 4/2010 | Nappa et al. | |
| 2012/0168672 A1 | 7/2012 | Nappa et al. | |
| 2013/0012420 A1* | 1/2013 | Matsumoto | C09K 5/045 508/569 |
| 2013/0105724 A1 | 5/2013 | Boussand | |
| 2014/0070132 A1 | 3/2014 | Fukushima et al. | |
| 2015/0008357 A1 | 1/2015 | Furuta et al. | |

FOREIGN PATENT DOCUMENTS

| | | | |
|---|---|---|---|
| JP | 2007-532767 | | 11/2007 |
| JP | 2012-505296 | | 3/2012 |
| JP | 2013-544896 | | 12/2013 |
| WO | WO 2011/118733 | * | 9/2011 |
| WO | WO 2012/157764 A1 | | 11/2012 |
| WO | WO 2013/154059 A1 | | 10/2013 |

OTHER PUBLICATIONS

Ya. A. Lisochkin et al. "Explosive-Hazard Estimates for Several Fluorine-Containing Monomers and Their Mixtures, Based on the Minimum Ignition Pressure with a Fixed Igniter Energy", Combustion, Explosion, and Shock Waves, vol. 42, No. 2, 2006, 4 Pages.

* cited by examiner

WORKING FLUID FOR HEAT CYCLE, COMPOSITION FOR HEAT CYCLE SYSTEM, AND HEAT CYCLE SYSTEM

This application is a continuation of PCT Application No. PCT/JP2015/057899, filed on Mar. 17, 2015, which is based upon and claims the benefit of priority from Japanese Patent Application No. 2014-053765 filed on Mar. 17, 2014. The contents of those applications are incorporated herein by reference in their entireties.

TECHNICAL FIELD

The present invention relates to a working fluid for heat cycle, a composition for a heat cycle system comprising it, and a heat cycle system employing the composition.

BACKGROUND ART

Heretofore, as a working fluid for heat cycle such as a refrigerant for a refrigerator, a refrigerant for an air-conditioning apparatus, a working fluid for a power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for heat cycle, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture fluid of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired.

Accordingly, in recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases. Further, abbreviated names of halogenated hydrocarbon compounds such as HFCs and HFOs are described in brackets after the compound names, and in this specification, the abbreviated names are employed instead of the compound names as the case requires.

As a working fluid employing a HFO, for example, Patent Document 1 discloses a technique relating to a working fluid using trifluoroethylene (HFO-1123) which has the above properties and with which excellent cycle performance will be obtained. Patent Document 1 also discloses an attempt to obtain a working fluid comprising HFO-1123 and various HFCs in combination for the purpose of increasing the flame retardancy, cycle performance, etc. of the working fluid.

Here, HFO-1123 is known to undergo self-decomposition at high temperature or with an ignition source under high pressure when used by itself. Therefore, Non-Patent Document 1 reports an attempt to suppress self-decomposition reaction by mixing HFO-1123 with another compound such as vinylidene fluoride to form a mixture having a lowered content of HFO-1123.

Further, as the HFO to be used for the working fluid for heat cycle, 2,3,3,3-tetrafluoropropene (HFO-1234yf) is known to be useful, and a technique relating to HFO-1234yf is under development. For example, Patent Document 2 discloses a composition containing HFO-1234yf obtained in production of HFO-1234yf by a specific method. The composition disclosed in Patent Document 2 includes many compounds, and a composition containing HFO-1234yf and HFO-1123 is included. However, HFO-1123 is only disclosed together with many other compounds as a by-product of HFO-1234yf, and use of a composition comprising HFO-1234yf and HFO-1123 mixed in a specific proportion as a working fluid is not disclosed.

PRIOR ART DOCUMENTS

Patent Documents

Patent Document 1: WO2012/157764
Patent Document 2: JP-A-2012-505296

Non-Patent Document

Non-Patent Document 1: Combusion, Explosion, and Shock Waves, Vol. 42, No 2, pp. 140-143, 2006

DISCLOSURE OF INVENTION

Technical Problem

As mentioned above, use of HFO-1123 as a working fluid has been studied, however, a specific composition with which HFO-1123 can be stably used while its excellent refrigerating cycle performance is maintained, has not been known. Particularly, HFO-1123 may undergo self-decomposition reaction under high temperature and high pressure conditions as mentioned above, and accordingly when HFO-1123 is used as a working fluid for heat cycle, an improvement of its durability is required when it is practically used.

Under these circumstances, it is an object of the present invention to provide a working fluid for heat cycle which has less influence over global warming, which has favorable cycle performance (capacity) and which is excellent in durability, a composition for a heat cycle system comprising the working fluid for heat cycle, and a heat cycle system employing the composition.

Solution to Problem

The present inventors have conducted extensive studies to achieve the above objects and as a result, found that a working fluid for heat cycle which is superior in the above properties can be obtained by combining HFO-1123 and HFO-1234yf in a specific proportion, and accomplished the present invention.

That is, the present invention provides a working fluid for heat cycle, a composition for a heat cycle system and a heat cycle system of the following [1] to [8].
[1] A working fluid for heat cycle, which contains trifluoroethylene and 2,3,3,3-tetrafluoropropene, wherein the proportion of the total amount of trifluoroethylene and 2,3,3,3-tetrafluoropropene based on the entire amount of the working fluid for heat cycle is higher than 90 mass % and at most 100 mass %, and the proportion of trifluoroethylene based on the total amount of trifluoroethylene and 2,3,3,3-tetrafluoropropene is at least 21 mass % and at most 39 mass %.

[2] The working fluid for heat cycle according to [1], wherein the proportion of trifluoroethylene based on the total amount of trifluoroethylene and 2,3,3,3-tetrafluoropropene is at least 23 mass % and at most 39 mass %.

[3] The working fluid for heat cycle according to [2], wherein the proportion of trifluoroethylene based on the total amount of trifluoroethylene and 2,3,3,3-tetrafluoropropene is at least 23 mass % and less than 35 mass %.

[4] The working fluid for heat cycle according to any one of [1] to [3], wherein the proportion of the total amount of trifluoroethylene and 2,3,3,3-tetrafluoropropene based on the entire amount of the working fluid for heat cycle is higher than 97 mass % and at most 100 mass %.

[5] A composition for a heat cycle system, which comprises the working fluid for heat cycle as defined in any one of [1] to [4], and a refrigerant oil.

[6] A heat cycle system, which employs the composition for a heat cycle system as defined in [5].

[7] The heat cycle system according to [6], which is a refrigerating apparatus, an air-conditioning apparatus, a power generation system, a heat transport apparatus or a secondary cooling machine.

[8] The heat cycle system according to [7], which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

Advantageous Effects of Invention

The working fluid for heat cycle and the composition for a heat cycle system comprising it of the present invention have practical cycle performance while the influence over global warming is suppressed, and have favorable durability. Thus, the heat cycle system of the present invention, which employs the composition for a heat cycle system of the present invention, has practical heat cycle performance while the influence over global warming is suppressed, has favorable durability, and is stable.

DESCRIPTION OF EMBODIMENTS

Now, the present invention will be described in detail.
<Working Fluid>

The working fluid of the present invention is a working fluid for heat cycle, which contains HFO-1123 and HFO-1234yf, wherein the proportion of the total amount of HFO-1123 and HFO-1234 contained based on the entire amount of the working fluid is higher than 90 mass % and at most 100 mass %, and the proportion of HFO-1123 based on the total amount of HFO-1123 and HFO-1234yf is at least 21 mass % and at most 39 mass %.

As heat cycle, heat cycle by a heat exchanger such as a condenser or an evaporator may be used without any particular restriction.

The working fluid for heat cycle of the present invention is a mixed fluid containing HFO-1123 and HFO-1234yf and as the case requires, another component. Here, the global warming potential (100 years) of HFO-1234yf is 4 as a value in Intergovernmental Panel on Climate Change (IPCC), Fourth assessment report (2007), and the global warming potential (100 years) of HFO-1123 is 0.3 as a value measured in accordance with IPCC Fourth assessment report. In this specification, GWP is a value (100 years) in IPCC Fourth assessment report, unless otherwise specified. Further, GWP of a mixture is represented by a weighted average by the composition mass.

The working fluid of the present invention contains HFO-1123 and HFO-1234yf having very low GWP in a total amount of higher than 90 mass %, and thereby the obtainable working fluid has a low GWP. In a case where another component having higher GWP than HFO-1123 and HFO-1234yf, for example, the after-described saturated HFC, is used, the lower its content, the lower GWP of the composition.

HFO-1123 used for the working fluid for heat cycle of the present invention is known to undergo chain self-decomposition reaction involving a rapid temperature and pressure increase at high temperature or with an ignition source under high pressure, when used alone. In the present invention, the working fluid for heat cycle is a mixture of HFO-1123 with HFO-1234yf with a lowered content of HFO-1123, whereby the self-decomposition reaction can be prevented. Here, in a case where the working fluid for heat cycle of the present invention is applied to a heat cycle system, the pressure conditions are usually at a level of 5.0 MPa or lower. Accordingly, by the working fluid for heat cycle comprising HFO-1123 and HFO-1234yf having no self-decomposition property under a pressure of 5.0 MPa, such a working fluid has high durability under conventional temperature conditions when applied to a heat cycle system.

Further, considering a case where a contingency such as a breakdown of a heat cycle system apparatus arises, by the composition having no self-decomposition property under a pressure of about 7.0 MPa, a working fluid with higher durability can be obtained.

The working fluid for heat cycle in the present invention, even having a composition with self-decomposition property, may be used for a heat cycle system with careful handling depending upon the conditions of use.

The proportion of HFO-1123 based on the total amount of HFO-1123 and HFO-1234yf in the working fluid for heat cycle is at least 21 mass % and at most 39 mass %, preferably at least 23 mass % and at most 39 mass %, more preferably at least 23 mass % and less than 35 mass %.

When the proportion of HFO-1123 based on the total amount of HFO-1123 and HFO-1234yf in the working fluid is within a range of at least 21 mass %, practical coefficient of performance and refrigerating capacity can be secured. When it is within a range of at least 23 mass %, a more favorable coefficient of performance can be obtained.

Further, when the proportion of HFO-1123 based on the total amount of HFO-1123 and HFO-1234yf in the working fluid is within a range of at most 39 mass %, the working fluid for heat cycle has no self-decomposition property under temperature conditions under which the working fluid is applied to a heat cycle system, and is excellent in the durability. Further, when the proportion of HFO-1123 based on the total amount of HFO-1123 and HFO-1234yf in the working fluid is within a range of less than 35 mass %, a working fluid for heat cycle which has no self-decomposition property even under higher pressure conditions and which is very excellent in the durability can be obtained. Such a working fluid, which has practical refrigerating capacity and coefficient of performance, can be used for a heat cycle system very stably even under high temperature conditions.

Further, the working fluid for heat cycle of the present invention has a total content of HFO-1123 and HFO-1234yf per 100 mass % of the working fluid of higher than 90 mass % and at most 100 mass %. When the total content of HFO-1123 and HFO-1234yf occupies most part of the working fluid, such as within the above range, such a working fluid has favorable durability while a certain cycle performance is maintained when used for a heat cycle system. The total content of HFO-1123 and HFO-1234yf per 100 mass % of the working fluid is more preferably higher than 97 mass % and at most 100 mass %.

As mentioned above, HFO-1123 and HFO-1234yf constituting the working fluid of the present invention are both HFOs and are compounds having less influence over global warming. Further, although HFO-1123 is excellent in the capacity as a working fluid, it may sometimes be insufficient in the coefficient of performance as compared with other HFOs. Further, when HFO-1123 is used alone, the durability as a working fluid is low due to self-decomposition under high temperature conditions and its life may be very short in some cases.

Whereas, HFO-1234yf is a HFO having a refrigerating capacity and a coefficient of performance as a working fluid in a balanced manner. Although HFO-1234yf has a critical temperature (94.7° C.) higher than HFO-1123, it is insufficient in the refrigerating cycle performance particularly refrigerating capacity when used alone.

The working fluid for heat cycle of the present invention comprises the above components which are not practically applicable when used by themselves, in a specific proportion, thereby having improved properties and being practically applicable.

[Optional Component]

The working fluid for heat cycle of the present invention may optionally contain a compound which is commonly used for a working fluid, in addition to HFO-1123 and HFO-1234yf, within a range not to impair the effects of the present invention.

Such an optional components is preferably a HFC, or a HFO (a HFC having a carbon-carbon double bond) other than HFO-1123 and HFO-1234yf.

(HFC)

As the HFC as an optional component, for example, a HFC having an effect to lower the temperature glide, an effect to improve the capacity or an effect to further increase the efficiency, when used for a heat cycle in combination with HFO-1123 and HFO-1234yf, is used. When the working fluid for heat cycle of the present invention contains such a HFC, more favorable cycle performance will be obtained.

Here, a HFC is known to have a higher GWP as compared with HFO-1123 and HFO-1234yf. Accordingly, the HFC to be used as an optional component is selected with a view to maintaining GWP within an acceptable range, in addition to improving the cycle performance as the working fluid.

A HFC which has less influence over the ozone layer and which has less influence over global warming, is specifically preferably a $C_{1-15}$ HFC. The HFC may be linear, branched or cyclic.

The HFC may, for example, be HFC-32, difluoroethane, trifluoroethane, tetrafluoroethane, HFC-125, pentafluoropropane, hexafluoropropane, heptafluoropropane, pentafluorobutane, heptafluorocyclopentane or the like.

Particularly, in view of less influence over the ozone layer and excellent refrigerating cycle performance, the HFC is preferably HFC-32, 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or HFC-125, more preferably HFC-32, HFC-134a or HFC-125.

The HFC may be used alone or in combination of two or more.

Further, with respect to GWP of the preferred HFC, GWP of HFC-32 is 675, GWP of HFC-134a is 1,430, and GWP of HFC-125 is 3,500. With a view to keeping GWP of the obtainable working fluid low, the HFC as the optional component is most preferably HFC-32.

In a case where the working fluid for heat cycle of the present invention comprises three compounds of HFO-1123, HFO-1234yf and HFC-32, HFC-32 is contained in a proportion of from 0 to 10 mass %. From the viewpoint of the relative coefficient of performance, the HFC-32 content is preferably at least 5 mass %, more preferably at least 8 mass %.

(HFO other than HFO-1123 and HFO-1234yf)

The HFO as an optional component may, for example, be trans-1,2-difluoroethylene (HFO-1132(E)), cis-1,2-difluoroethylene (HFO-1132(Z)), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf).

Particularly, the HFO as an optional component is, in view of a high critical temperature and excellent safety and coefficient of performance, preferably HFO-1234ze(E) or HFO-1234ze(Z), more preferably HFO-1234ze(E).

Such HFO other than HFO-1123 and FH0-1234yf may be used alone or in combination of two or more.

In a case where the working fluid for heat cycle of the present invention contains a HFC and/or a HFO other than HFO-1123 and HFO-1234yf as the optional component, the total content of the HFC and the HFO other than HFO-1123 and HFO-1234yf per 100 mass % of the working fluid is at most 10 mass %, preferably from 1 to 10 mass %, more preferably from 1 to 7 mass %, further preferably from 2 to 7 mass %. The total content of the HFC and the HFO other than HFO-1123 and HFO-1234yf in the working fluid is properly adjusted within the above range depending upon the type of the HFC and the HFO other than HFO-1123 and HFO-1234yf. On that occasion, the total content is adjusted with a view to lowering temperature glide, improving the capacity or further increasing the efficiency, and further considering the global warming potential, when the HFC and the HFO are used for a heat cycle in combination with HFO-1123 and HFO-1234yf.

(Other Optional Component)

The working fluid for heat cycle of the present invention may contain, in addition to the above optional components, another optional component such as carbon dioxide, a hydrocarbon, a chlorofluoroolefin (CFO) or a hydrochlorofluoroolefin (HCFO). Such another optional component is preferably a component which has less influence over the ozone layer and which has less influence over global warming.

The hydrocarbon may, for example, be propane, propylene, cyclopropane, butane, isobutane, pentane or isopentane.

The hydrocarbon may be used alone or in combination of two or more.

In a case where the working fluid for heat cycle of the present invention contains a hydrocarbon, its content is at most 10 mass %, preferably from 1 to 10 mass %, more preferably from 1 to 7 mass %, further preferably from 2 to 5 mass % per 100 mass % of the working fluid. When the content of the hydrocarbon is at least the lower limit, the solubility of a mineral refrigerant oil in the working fluid will be more favorable.

The CFO may, for example, be chlorofluoropropene or chlorofluoroethylene. With a view to suppressing flammability of the working fluid for heat cycle of the present invention without significantly decreasing the cycle performance of the working fluid, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

In a case where the working fluid for heat cycle of the present invention contains the CFO, its content is at most 10 mass %, preferably from 1 to 10 mass %, more preferably from 1 to 7 mass %, further preferably from 2 to 7 mass % per 100 mass % of the working fluid. When the content of the CFO is at least the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing flammability of the working fluid for heat cycle of the present invention without significantly decreasing the cycle performance of the working fluid, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid for heat cycle of the present invention contains the HCFO, the content of the HCFO per 100 mass % of the working fluid is at most 10 mass %, preferably from 1 to 10 mass %, more preferably from 1 to 7 mass %, further preferably from 2 to 7 mass %. When the content of the HCFO is at least the lower limit, the flammability of the working fluid tends to be suppressed. When the content of the HCFO is at most the upper limit, favorable cycle performance is likely to be obtained.

In a case where the working fluid for heat cycle of the present invention contains the above optional component and another optional component, the total content is at most 10 mass % per 100 mass % of the working fluid.

The above-described working fluid for heat cycle of the present invention is obtained by mixing HFO-1123 excellent in the capacity as a working fluid and HFO-1234yf having a capacity and an efficiency as the working fluid in a balanced manner, both being HFOs having less influence over global warming, in a specific proportion. And, the working fluid for heat cycle of the present invention thus obtained, comprises components in such a proportion as to secure the cycle performance, considering the durability, and has practical cycle performance while the influence over global warming is suppressed.

[Application to Heat Cycle System]
(Composition for Heat Cycle System)

The working fluid for heat cycle of the present invention may be used for the composition for a heat cycle system of the present invention usually as mixed with a refrigerant oil when applied to a heat cycle system. The composition for a heat cycle system of the present invention may further contain known additives such as a stabilizer and a leak detecting substance in addition to the above components.

(Refrigerant Oil)

As the refrigerant oil, a known refrigerant oil which has been used for a composition for a heat cycle system together with a working fluid comprising a halogenated hydrocarbon may be used without any particular restriction. The refrigerant oil may, for example, be specifically an oxygen-containing refrigerant oil (such as an ester refrigerant oil or an ether refrigerant oil), a fluorinated refrigerant oil, a mineral refrigerant oil or a hydrocarbon refrigerant oil.

The ester refrigerant oil may, for example, be a dibasic acid ester oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). The dibasic acid ester oil may, for example, be specifically ditridecyl glutarate, di(2-ethylhexyl) adipate, diisodecyl adipate, ditridecyl adipate or di(3-ethylhexyl) sebacate.

The polyol ester oil is preferably an ester of a diol (such as ethylene glycol, 1,3-propanediol, propylene glycol, 1,4-butanediol, 1,2-butanediol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary α carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, and a monohydric alcohol and a polyol. The fatty acid, the dibasic acid, the monohydric alcohol and the polyol may be the same as described above.

The polyol carbonate oil is an ester of carbonic acid and a polyol.

The polyol may be the same diol as described above or the same polyol as described above. Further, the polyol carbonate oil may be a ring-opening polymer of a cyclic alkylene carbonate.

The ether refrigerant oil may be a polyvinyl ether oil or a polyoxyalkylene oil.

The polyvinyl ether oil may be one obtained by polymerizing a vinyl ether monomer such as an alkyl vinyl ether, or a copolymer obtained by copolymerizing a vinyl ether monomer and a hydrocarbon monomer having an olefinic double bond.

The vinyl ether monomer may be used alone or in combination of two or more.

The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or an alkyl-substituted styrene. The hydrocarbon monomer having an olefinic double bond may be used alone or in combination of two or more.

The polyvinyl ether copolymer may be either of a block copolymer and a random copolymer. The polyvinyl ether oil may be used alone or in combination of two or more.

The polyoxyalkylene oil may, for example, be a polyoxyalkylene monool, a polyoxyalkylene polyol, an alkyl ether of a polyoxyalkylene monool or a polyoxyalkylene polyol, or an ester of a polyoxyalkylene monool or a polyoxyalkylene polyol.

The polyoxyalkylene monool or the polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator used for the reaction may, for example, be water, a monohydric alcohol such as methanol or butanol, or a polyhydric alcohol such as ethylene glycol, propylene glycol, pentaerythritol or glycerol.

The polyoxyalkylene oil is preferably an alkyl ether or ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyglycol oil.

The fluorinated refrigerant oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral refrigerant oil may, for example, be a naphthene mineral oil or a paraffin mineral oil obtained by purifying a refrigerant oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon refrigerant oil may, for example, be a poly-α-olefin, an alkylbenzene or an alkylnaphthalene.

The refrigerant oil may be used alone or in combination of two or more.

The refrigerant oil is preferably at least one member selected from the polyol ester oil, the polyvinyl ether oil and the polyglycol oil in view of the compatibility with the working fluid.

The amount of the refrigerant oil is within a range not to remarkably decrease the effects of the present invention, and is preferably from 10 to 100 parts by mass, more preferably from 20 to 50 parts by mass per 100 parts by mass of the working fluid.

(Stabilizer)

The stabilizer is a component which improves the stability of the working fluid against heat and oxidation. As the stabilizer, a known stabilizer which has been used for a heat cycle system together with a working fluid comprising a halogenated hydrocarbon, for example, an oxidation resistance-improving agent, a heat resistance-improving agent or a metal deactivator, may be used without any particular restrictions.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthyamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). The oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylysine-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The amount of the stabilizer is within a range not to remarkably decrease the effects of the present invention, and is preferably at most 5 parts by mass, more preferably at most 1 part by mass per 100 parts by mass of the working fluid.

(Leak Detecting Substance)

As a leak detecting substance, an ultraviolet fluorescent dye, an odor gas or an odor masking agent may, for example, be mentioned.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The amount of the leak detecting substance is not particularly limited within a range not to remarkably decrease the effects of the present invention, and is preferably at most 2 parts by the mass, more preferably at most 0.5 part by the mass per 100 parts by the mass of the working fluid.

<Heat Cycle System>

The heat cycle system of the present invention is a system employing the working fluid for heat cycle of the present invention. When the working fluid for heat cycle of the present invention is applied to a heat cycle system, usually, it is applied as a composition for a heat cycle system containing the working fluid. The heat cycle system of the present invention may be a heat pump system utilizing heat obtained by a condenser or may be a refrigerating cycle system utilizing coldness obtained by an evaporator.

The heat cycle system of the present invention may, for example, be specifically a refrigerating apparatus, an air-conditioning apparatus, a power generation system, a heat transfer apparatus and a secondary cooling machine. Among them, the heat cycle system of the present invention, which stably exhibits heat cycle performance in a working environment at higher temperature, is preferably employed as an air-conditioning apparatus to be disposed outdoors in many cases. Further, the heat cycle system of the present invention is preferably employed also for a refrigerating apparatus.

The air-conditioning apparatus may, for example, be specifically a room air-conditioner, a package air-conditioner (such as a store package air-conditioner, a building package air-conditioner or a plant package air-condition, a gas engine heat pump, a train air-conditioning system or an automobile air-conditioning system.

The refrigerating apparatus may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Figure 1:
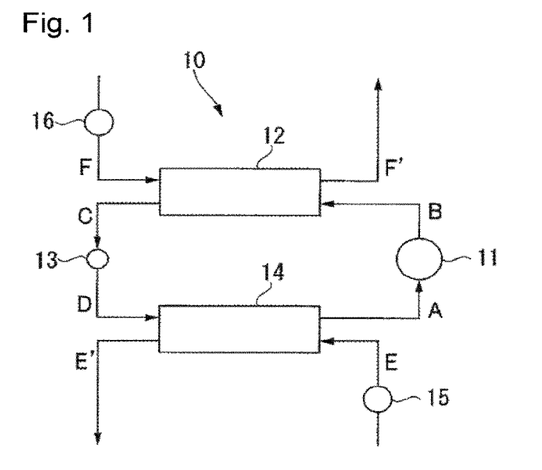
FIG. 1 is a schematic construction view illustrating a refrigerating cycle system as an example of a heat cycle system of the present invention.

Now, as an example of the heat cycle system according the embodiment of the present invention, a refrigerating cycle system will be described with reference to a refrigerating cycle system 10 which has been roughly described above, of which the schematic construction view is shown in FIG. 1, as an example. A refrigerating cycle system is a system utilizing coldness obtained by an evaporator.

A refrigerating cycle system 10 shown in FIG. 1 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure-enthalpy chart (curve) as shown in FIG. 2, may be represented as a trapezoid having points A, B, C and D as vertexes.

Figure 2:
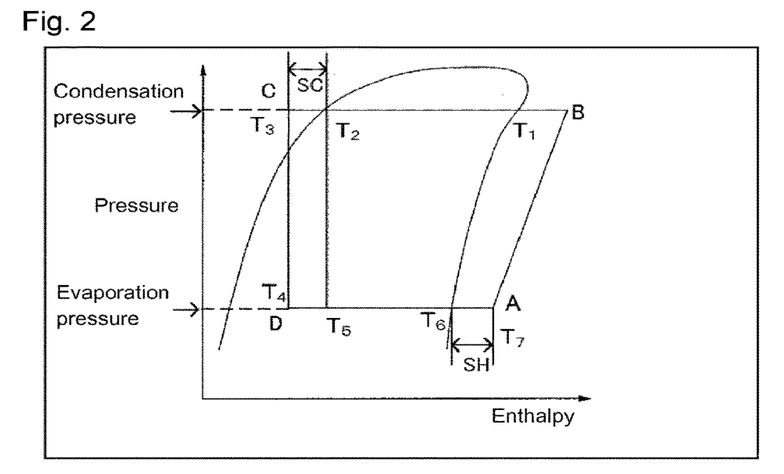
FIG. 2 is a cycle diagram illustrating the state change of a working fluid in a refrigerating cycle system in FIG. 1 on a pressure-enthalpy chart.

The AB process is a process wherein adiabatic compression is carried out by the compressor 11 to change the high temperature/low pressure working fluid vapor A to a high temperature/high pressure working fluid vapor B, and is represented by the line AB in FIG. 2.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure enthalpy chart and the BC line, the intersection point $T_1$ on the high enthalpy side is the condensing temperature, and the intersection point $T_2$ on the low enthalpy side is the condensation boiling point temperature. Here, the temperature glide of a non-azeotropic mixture fluid such as a mixed fluid of HFO-1123 and HFO-1234yf is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 2. The pressure in this process is the evaporation pressure. Of the two intersection points of the pressure enthalpy chart and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

Here, cycle performance of the working fluid is evaluated, for example, by the refrigerating capacity (hereinafter referred to as "Q" as the case requires) and the coefficient of performance (hereinafter referred to as "COP" as the case requires) of the working fluid. Q and COP of the working fluid are obtained respectively in accordance with the following formulae (1) and (2) from enthalpies $h_A$, $h_B$, and $h_D$ in the respective states A (after evaporation, high temperature and low pressure), B (after compression, high temperature and high pressure), C (after condensation, low temperature and high pressure) and D (after expansion, low temperature and low pressure) of the working fluid:

$$Q = h_A - h_D \quad (1)$$

$$COP = Q/\text{compression work} = (h_A - h_D)/(h_B - h_A) \quad (2)$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid having a higher Q, the desired performance can be obtained with a smaller amount, whereby the system can be downsized.

In the heat cycle system of the present invention employing the working fluid for heat cycle of the present invention, for example, in a refrigerating cycle system 10 shown in FIG. 1, as compared with a case where R410 (a mixed fluid of HFC-32 and HFC-125 in a mass ratio of 1:1) which has been commonly used for an air-conditioning apparatus or the like is used, it is possible to achieve practical levels of Q and COP while remarkably suppressing the global warming potential.

(Moisture Concentration)

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the refrigerant oil, deterioration of materials by an acid component formed in the cycle, formation of contaminants, etc. may arise. Particularly, if the refrigerant oil is a polyglycol oil or a polyol ester oil, it has extremely high moisture absorbing properties and is likely to undergo hydrolysis, and inclusion of moisture decreases properties of the refrigerant oil and may be a great cause to impair the long term reliability of a compressor. Accordingly, in order to suppress hydrolysis of the refrigerant oil, it is necessary to control the moisture concentration in the heat cycle system.

As a method of controlling the moisture concentration in the heat cycle system, a method of using a moisture-removing means such as a desiccating agent (such as silica gel, activated alumina, zeolite or lithium chloride) may be mentioned. The desiccating agent is preferably brought into contact with the working fluid in a liquid state, in view of the dehydration efficiency. For example, the desiccating agent is preferably located at the outlet of the condenser 12 or at the inlet of the evaporator 14 to be brought into contact with the working fluid.

The desiccating agent is preferably a zeolite desiccating agent in view of chemical reactivity of the desiccating agent and the working fluid, and the moisture absorption capacity of the desiccating agent.

The zeolite desiccating agent is, in a case where a refrigerant oil having a large moisture absorption as compared with a conventional mineral refrigerant oil is used, preferably a zeolite desiccating agent containing a compound represented by the following formula (3) as the main component in view of excellent moisture absorption capacity.

$$M_{2/n}O \cdot Al_2O_3 \cdot xSiO_2 \cdot yH_2O \quad (3)$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working fluid is used, the working fluid is adsorbed in the desiccating agent and as a result, chemical reaction of the working fluid with the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid, it is possible to selectively adsorb and remove only moisture in the heat cycle system without adsorbing the working fluid. In other words, the working fluid is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the working fluid is not particularly limited.

The moisture concentration in the heat cycle system is preferably less than 10,000 ppm, more preferably less than 1,000 ppm, particularly preferably less than 100 ppm by the mass ratio based on the working fluid for heat cycle.

(Non-condensing Gas Concentration)

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the refrigerant oil and promotes their decomposition.

The non-condensing gas concentration is preferably less than 10,000 ppm, more preferably less than 1,000 ppm, particularly preferably less than 100 ppm by the mass ratio based on the working fluid for heat cycle.

(Chlorine Concentration)

If chlorine is present in the heat cycle system, it has adverse effects such as formation of a deposit by a reaction with a metal, friction of a bearing, and decomposition of the working fluid for heat cycle or the refrigerant oil.

The chlorine concentration in the heat cycle system is preferably at most 100 ppm, particularly preferably at most 50 ppm by the mass ratio based on the working fluid for heat cycle.

(Metal Concentration)

If a metal such as palladium, nickel or iron is present in the heat cycle system, it has adverse effects such as decomposition or oligomerization of HFO-1123.

The metal concentration in the heat cycle system is preferably at most 5 ppm, particularly preferably at most 1 ppm by the mass ratio based on the working fluid for heat cycle.

(Acid Concentration)

If an acid is present in the heat cycle system, it has adverse effects such as oxidative destruction or acceleration of self-decomposition reaction of HFO-1123.

The acid concentration in the heat cycle system is preferably at most 1 ppm, particularly preferably at most 0.2 ppm by the mass ratio based on the working fluid for heat cycle.

Further, it is preferred to provide a means to remove an acid content by a deoxidizing agent such as NaF in the heat cycle system, for the purpose of removing the acid content from the composition for heat cycle, thereby to remove the acid content from the heat cycle composition.

(Residue Concentration)

If a residue such as a metal powder, an oil other than the refrigerant oil or a high boiling component is present in the heat cycle system, it has adverse effects such as clogging of a vaporizer and an increase in the resistance of a rotating part.

The residue concentration in the heat cycle system is preferably at most 1,000 ppm, particularly preferably at most 100 ppm by the mass ratio based on the working fluid for heat cycle.

The residue may be removed by subjecting the working fluid for heat cycle to filtration through e.g. a filter. Further, the components (HFO-1123, HFO-1234yf and the like) of the working fluid for heat cycle may be separately subjected to filtration through a filter to remove the residue, before they are formed into a working fluid for heat cycle, and then the components are mixed to form a working fluid for heat cycle.

The above-described heat cycle system of the present invention, which employs the composition for a heat cycle system of the present invention, has practical cycle performance while the influence over global warming is suppressed, and has high durability.

EXAMPLES

Now, the present invention will be described in further detail with reference to Examples. However, it should be understood that the present invention is by no means restricted thereto. Ex. 1 to 4 are Examples of the present invention, and Ex. 5 to 8 are Comparative Examples.

Ex. 1 to 8

In accordance with a conventional method, HFO-1123 and HFO-1234yf were mixed in a proportion as identified in Table 1 to obtain a working fluid for heat cycle (Ex. 1 to 8). The proportion of the total amount of HFO-1123 and HFO-1234yf based on the entire amount of the working fluid is 100 mass %.

TABLE 1

| Working fluid | Working fluid composition ||
| | HFO-1123 [mass %] | HFO-1234yf [mass %] |
| --- | --- | --- |
| Ex. 1 | 29.7 | 70.3 |
| Ex. 2 | 31.5 | 68.5 |
| Ex. 3 | 35.8 | 64.2 |
| Ex. 4 | 38.0 | 62.0 |
| Ex. 5 | 40.9 | 59.1 |
| Ex. 6 | 48.1 | 51.9 |
| Ex. 7 | 54.0 | 46.0 |
| Ex. 8 | 64.9 | 35.1 |

Now, with respect to the working fluid of the present invention, the properties i.e. self-decomposition property, the coefficient of performance, the refrigerating capacity and GWP were examined as described hereinafter.

(Evaluation of Self-decomposition Property)

With respect to the above-obtained working fluids in Ex. 1 to 8, evaluation test (Tests 1-1- to 8-1) on self-decomposition property was carried out under the test pressure as identified in Table 2. Evaluation of the self-decomposition property was conducted in equipment in accordance with method A recommended as equipment for measurement of the combustion range of a gas mixture containing halogen, by individual notifications in High Pressure Gas Safety Act.

Figure 3:
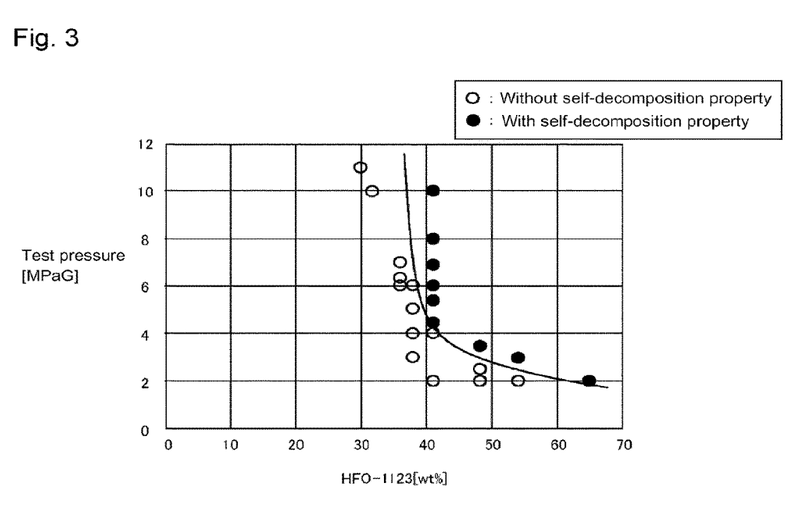
FIG. 3 is a diagram illustrating the relation between the pressure and the self-decomposition property of HFO-1123 in Examples.

Each of the working fluids in Ex. 1 to 8 was enclosed in a spherical pressure resistant reactor having an internal capacity of 650 cm$^3$ and having a temperature in the interior of the reactor controlled to a range of from 190° C. to 210° C. by heating by a heater from the outside, to a pressure as identified in Table 2. Then, a platinum wire (outer diameter: 0.5 mm, length: 25 mm) placed in the interior of the spherical pressure resistant reactor was fused under a voltage of 10 V at an electric current of 50 A (hot wire method). Temperature and pressure changes in the pressure resistant reactor after fusing were measured. Further, the gas composition after the test was analyzed. In a case where a pressure increase and a temperature increase were confirmed after the test, and a self-decomposition reaction product ($CF_4$, HF, coke) in an amount of at least 20 mol % per 100 mol % of HFO-1123 charged was detected by the gas analysis after the test, such a case was evaluated that self-decomposition reaction occurred. The results are shown in Table 2 and FIG. 3 together with the pressure conditions. The pressure in Table 2 and FIG. 3 is the gauge pressure. Further, FIG. 3 is a graph illustrating as to whether the working fluid has self-decomposition property in terms of the relation between the content of HFO-1123 in the working fluid and the pressure.

TABLE 2

| Test Ex. | Working fluid | Test pressure [MPaG] | Self-decomposition property |
|---|---|---|---|
| 1-1 | Ex. 1 | 11.0 | Nil |
| 2-1 | Ex. 2 | 10.0 | Nil |
| 3-1 | Ex. 3 | 6.0 | Nil |
| 3-2 |  | 6.34 | Nil |
| 3-3 |  | 7.0 | Nil |
| 4-1 | Ex. 4 | 3.0 | Nil |
| 4-2 |  | 4.0 | Nil |
| 4-3 |  | 5.0 | Nil |
| 4-4 |  | 6.0 | Nil |
| 5-1 | Ex. 5 | 2.0 | Nil |
| 5-2 |  | 3.0 | Nil |
| 5-3 |  | 4.0 | Nil |
| 5-4 |  | 4.45 | Observed |
| 5-5 |  | 5.37 | Observed |
| 5-6 |  | 6.0 | Observed |
| 5-7 |  | 6.91 | Observed |
| 5-8 |  | 8.0 | Observed |
| 5-9 |  | 10.0 | Observed |
| 6-1 | Ex. 6 | 2.0 | Nil |
| 6-2 |  | 2.5 | Nil |
| 6-3 |  | 3.5 | Observed |
| 7-1 | Ex. 7 | 2.0 | Nil |
| 7-2 |  | 3.0 | Observed |
| 8-1 | Ex. 8 | 2.0 | Observed |

From Table 2 and FIG. 3, a working fluid having a proportion of HFO-1123 based on the total amount of HFO-1123 and HFO-1234yf in the working fluid for heat cycle of at most 39 mass %, was confirmed to have no self-decomposition property under a pressure of at most 5 MPa, and a working fluid having said proportion of less than 35 mass % was confirmed to have no self-decomposition property under a pressure of at most 7 MPa. In FIG. 3, the solid curve is an auxiliary line estimated to be a boundary between with and without self-decomposition property of the working fluids in Examples of the present invention.

(Evaluation of Refrigerating Cycle Performance)

Working fluids for heat cycle comprising HFO-1123 and HFO-1234yf in proportions as identified in Table 3 were obtained in the same manner as in Examples of the present invention. To measure the refrigerating cycle performance of such working fluids, the refrigerating cycle performance (refrigerating capacity and coefficient of performance) was evaluated as the cycle performance (capacity and efficiency) in a case where each working fluid for heat cycle was applied to a refrigerating cycle system 10 shown in FIG. 1, and a heat cycle as shown in FIG. 2, that is, adiabatic compression by a compressor 11 in the AB process, isobaric cooling by a condenser 12 by the BC process, isoenthalpic expansion by an expansion valve 13 in the CD process, and isobaric heating in an evaporator 14 in the DA process, were carried out.

The evaluation was conducted under temperature conditions such that the average evaporation temperature of the working fluid for heat cycle in the evaporator 14 was 0° C., the average condensing temperature of the working fluid for heat cycle in the condenser 12 was 40° C., the supercoiling degree of the working fluid for heat cycle in the condenser 12 was 5° C., and the degree of superheat of the working fluid for heat cycle in the evaporator 14 was 5° C. Further, it was assumed that there was no loss in the equipment efficiency and no pressure loss in the pipe lines and heat exchanger.

The refrigerating capacity and the coefficient of performance were obtained in accordance with the above formulae (1) and (2) from enthalpies h in the respective states of the working fluid for heat cycle, i.e. A (after evaporation, high temperature and low pressure), B (after compression, high temperature and high pressure), C (after condensation, low temperature and high pressure) and D (after expansion, low temperature and low pressure).

The thermodynamic properties required for calculation of the refrigerating cycle performance were calculated based on the generalized equation of state (Soave-Redlich-Kwong equation) based on the law of corresponding state and various thermodynamic equations. If a characteristic value was not available, it was calculated employing an estimation technique based on a group contribution method.

The refrigerating capacity and the coefficient of performance were obtained as relative values based on the refrigerating capacity and the coefficient of performance of R410A being 1.000.

Further, GWP of the working fluid was obtained by a weighted average of the GWP (HFO-1123: 0.3, HFO-1234yf: 4) of the compounds as the materials by the composition mass. That is, GWP of the working fluid was obtained by dividing the sum of products of mass % and GWP of the respective components constituting the working fluid, by 100.

The results of the refrigerating capacity (based on R410A) and the coefficient of performance (based on R410A) and the results of calculation of GWP are shown in Table 3.

TABLE 3

| Working fluid composition | | Relative performance (based on R410A) | | |
|---|---|---|---|---|
| HFO-1123 [mass %] | HFO-1234yf [mass %] | Coefficient of performance | Refrigerating capacity | GWP |
| 100 | 0 | 0.921 | 1.146 | 0.3 |
| 40 | 60 | 1.002 | 0.734 | 2.5 |
| 39 | 61 | 1.004 | 0.727 | 2.6 |
| 38 | 62 | 1.006 | 0.720 | 2.6 |
| 37 | 63 | 1.007 | 0.712 | 2.6 |
| 36 | 64 | 1.009 | 0.705 | 2.7 |
| 35 | 65 | 1.010 | 0.698 | 2.7 |
| 30 | 70 | 1.018 | 0.660 | 2.9 |
| 25 | 75 | 1.024 | 0.622 | 3.1 |
| 24 | 76 | 1.025 | 0.614 | 3.1 |
| 23 | 77 | 1.026 | 0.606 | 3.1 |
| 22 | 78 | 1.027 | 0.599 | 3.2 |
| 21 | 79 | 1.028 | 0.590 | 3.2 |
| 20 | 80 | 1.029 | 0.583 | 3.3 |
| 0 | 100 | 1.046 | 0.422 | 4.0 |

It is found from the results in Table 3 that the working fluid for heat cycle of the present invention has a coefficient of performance equal to or higher than that of R410A, and refrigerating capacity within a practically applicable range although it is low as compared with R410A. Here, a practically applicable range means a refrigerating capacity of at least 0.590 as compared with R410R, and within this range, such a working fluid can be used as a working fluid for heat cycle. Further, it was confirmed that a working fluid containing HFO-1123 and HFO-1234yf has an improved coefficient of performance as compared with HFO-1123 by itself, and has a low GWP.

It was found from the above results that each of the working fluids in Ex. 1 to 4 which are Examples of the present invention has a low GWP, a practical cycle performance based on R410A, and has no self-decomposition property even under high pressure conditions and is excellent in durability.

INDUSTRIAL APPLICABILITY

The working fluid of the present invention is useful as a refrigerant for a refrigerating apparatus (such as a built-in showcase, a separate showcase, an industrial fridge freezer, a vending machine or an ice making machine), a refrigerant for an air-conditioning apparatus (such as a room air-conditioner, a store package air-conditioner, a building package air-conditioner, a plant package air-conditioner, a gas engine heat pump, a train air-conditioning system or an automobile air-conditioning system), a working fluid for a power generation system (such as exhaust heat recovery power generation), a working fluid for a heat transport apparatus (such as a heat pipe) or a secondary cooling fluid.

REFERENCE SYMBOLS

10: Refrigerating cycle system, 11: compressor, 12: condenser, 13: expansion valve, 14: evaporator, 15, 16: pump.

What is claimed is:

1. A working fluid for heat cycle, comprising:
trifluoroethylene and 2,3,3,3-tetrafluoropropene,
wherein
a proportion of a total amount of trifluoroethylene and 2,3,3,3-tetrafluoropropene based on an entire amount of the working fluid is higher than 90 mass % and at most 100 mass %, and
a proportion of trifluoroethylene based on the total amount of trifluoroethylene and 2,3,3,3-tetrafluoropropene is at least 29.7 mass % and at most 38.0 mass %.

2. The working fluid according to claim 1, wherein the proportion of trifluoroethylene based on the total amount of trifluoroethylene and 2,3,3,3-tetrafluoropropene is at least 31.5 mass % and at most 38.0 mass %.

3. The working fluid according to claim 2, wherein the proportion of trifluoroethylene based on the total amount of trifluoroethylene and 2,3,3,3-tetrafluoropropene is at least 31.5 mass % and less than 35 mass %.

4. The working fluid according to claim 1, wherein the proportion of the total amount of trifluoroethylene and 2,3,3,3-tetrafluoropropene based on the entire amount of the working fluid is higher than 97 mass % and at most 100 mass %.

5. A composition for a heat cycle system, comprising:
the working fluid according to claim 1, and
a refrigerant oil.

6. A heat cycle system, which employs the composition according to claim 5.

7. The heat cycle system according to claim 6, which is a refrigerating apparatus, an air-conditioning apparatus, a power generation system, a heat transport apparatus or a secondary cooling machine.

8. The heat cycle system according to claim 7, which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

* * * * *